United States Patent
Hyun et al.

(10) Patent No.: US 9,467,623 B2
(45) Date of Patent: Oct. 11, 2016

(54) IMAGE CORRECTING APPARATUS AND METHOD FOR IMAGING DEVICE

(71) Applicant: SAMSUNG ELECTRO-MECHANICS CO., LTD., Suwon-si (KR)

(72) Inventors: Hae Seung Hyun, Suwon-si (KR); Hee Bum Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 164 days.

(21) Appl. No.: 14/266,146

(22) Filed: Apr. 30, 2014

(65) Prior Publication Data

US 2015/0130954 A1 May 14, 2015

(30) Foreign Application Priority Data

Nov. 8, 2013 (KR) .................. 10-2013-0135496

(51) Int. Cl.
*H04N 5/232* (2006.01)

(52) U.S. Cl.
CPC ........ *H04N 5/23267* (2013.01); *H04N 5/2328* (2013.01); *H04N 5/23258* (2013.01)

(58) Field of Classification Search
CPC ............ H04N 5/23267; H04N 5/23258; H04N 5/232876; H04N 5/23251; H04N 5/23248; H04N 5/23254; H04N 5/2328
See application file for complete search history.

(56) References Cited

U.S. PATENT DOCUMENTS

| | | | |
|---|---|---|---|
| 7,372,483 B2 * | 5/2008 | Nomura | H04N 5/23248 348/208.1 |
| 8,373,761 B2 | 2/2013 | Jang et al. | |
| 8,493,454 B1 * | 7/2013 | Kohn | H04N 5/23258 348/208.2 |
| 8,497,916 B2 * | 7/2013 | Ogura | H04N 5/23267 348/208.13 |
| 9,232,138 B1 * | 1/2016 | Baldwin | H04N 5/23264 |
| 2013/0141603 A1 * | 6/2013 | Imada | H04N 5/23254 348/208.6 |

* cited by examiner

*Primary Examiner* — Luong T Nguyen
(74) *Attorney, Agent, or Firm* — NSIP Law

(57) ABSTRACT

Embodiments of the invention provide an image correcting apparatus for an imaging device including a camera module having a first motion sensor. The image correct apparatus includes a second motion sensor sensing a movement, and a controller determining whether the movement gets out of an operation range of the first motion sensor, and correcting an image obtained from the camera module based on movement data sensed by the second motion sensor, when the movement gets out of the operation range of the first motion sensor. Generation of blur in an image when a displacement of handshaking is at an angle equal to or greater than a correction angle of an optical image stabilizer (OIS) module is prevented, and thus, a clear image is obtained.

15 Claims, 4 Drawing Sheets

HANDSHAKE TRACE

IMAGE CORRECTING APPARATUS AND METHOD FOR IMAGING DEVICE

CROSS REFERENCE TO RELATED APPLICATION

This application claims the benefit of and priority under 35 U.S.C. §119 to Korean Patent Application No. KR 10-2013-0135496, entitled "Image Correcting Apparatus and Method in Imaging Device," filed on Nov. 8, 2013, which is hereby incorporated by reference in its entirety into this application.

BACKGROUND

1. Field of the Invention

The present invention to an image correcting apparatus and method in an imaging device.

2. Description of the Related Art

Generally, when a user captures an image of a subject, handshaking occurs, and a digital imaging device, such as a camera, may be shaken due to handshaking. Such shaking causes an image input through an image sensor to be shaken to result in a degradation of quality of an imaging outcome.

Recently, cameras have becoming smaller and lighter, and thus, handshaking intensifies, and as imaging is increasingly performed while on the move, solution to the problem of shake holds a place as an important factor to obtain quality images.

A digital imaging device may have a handshake correction function to prevent failure of imaging due to handshaking, and a technique of automatically correcting handshaking by a camera is known as an optical image stabilizer (OIS).

In general, while a certain image being captured by using a camera, movements such as shaking of a hand or body, a movement of a hand or a body, and the like, may be delivered to the camera, and the captured image is blurred, rather than being clear (or sharp), due to the delivered movement.

In general, there are two types of camera movement.

A first type of camera movement is a vertical camera movement on a lens axis thereof (or an axis of an image sensor), and a second type of camera movement is a horizontal camera movement on a lens axis. A vertical movement is called pitching, and a horizontal movement is called yawing. Each time a user captures an image by pressing a shutter button of a camera, the pitching or yawing movement of the camera occurs.

In order to correct such a camera movement, an optical image stabilizer (OIS) scheme, one of typical conventional arts, is provided.

The OIS scheme includes two types of scheme: an image sensor shift scheme and a lens shift scheme. Portable imaging devices commonly use the image sensor shift scheme. In the image sensor shift scheme, an image sensor is moved, while following a movement of an image generated according to handshaking. Namely, the image sensor is moved in the opposite to a direction of handshaking to allow an image focused on the image sensor to be constantly maintained in position. The lens shift scheme is a scheme in which a lens, instead of an image sensor, is moved.

The related OIS scheme has the following limitations.

In case of capturing a still image, when a surrounding environment is dark, an exposure time may be adjusted to be lengthened, and in this case, if displacement of handshaking is at an angle equal to or greater than a correction angle of an OIS module even for a short time during a long period of time, an image is blurred. The correction angle refers to a range in which a clear image (or a sharp image) is captured when a degree of shake occurring in the event of image capturing is converted into an angle. As the correction angle is greater, great shake may be correct.

For example, in relation to a correction angle of an OIS module, a specified product guarantees a correction angle of approximately 1 degree. The limitation in the correction angle has some reasons.

First, displacement of a lens shift in an OIS module is very small. This is because an OIS module itself has a limitation in size. Also, this is associated with performance of an actuator.

Second, an operation range of a motion sensor within an OSI module to measure handshaking is very narrow. In case of a movement by 1 degree or more, it falls outside of the operation range of the motion sensor, rendering an output of the motion sensor to be saturated. In case of a motion sensor, an operation range thereof is a trade-off with resolution, so a motion sensor is designed according to OIS module performance.

U.S. Pat. No. 8,373,761 is an example of conventional art, which describes a shake correcting method and apparatus thereof in a digital imaging device, whereby a shake of a digital imaging device is corrected by driving an optical shake correcting member and a shake (or a movement) of a subject is corrected by the optical shake correcting member or a digital image stabilizing unit upon translating information of the subject that comes to an image capture surface in real time, thereby capturing a subjected-centered stabilized image. However, when an exposure duration lengthens, the shake correcting method and apparatus described in U.S. Pat. No. 8,373,761 lack the ability to prevent generation of blur in an image in a case in which displacement of handshaking is at an angle equal to or greater than a correction angle of an OIS module even for a short time during a long period of time.

Thus, an image correcting apparatus and method in an imaging device that may be capable of obtaining a clear image by preventing generation of blur in an image when displacement of handshaking is at an angle equal to or greater than a correction angle of an OIS module are required.

SUMMARY

Accordingly, embodiments of the invention provide an image correcting apparatus for an imaging device capable of obtaining a clear image by preventing generation of blur in an image in a case in which displacement of handshaking is at an angle equal to or greater than a correction angle of an optical image stabilizer (OIS) module.

Embodiments of the invention have also been made in an effort to provide an image correcting method for an imaging device capable of obtaining a clear image by preventing generation of blur in an image in a case in which displacement of handshaking is at an angle equal to or greater than a correction angle of an optical image stabilizer (OIS) module.

According to an embodiment of the invention, there is provided an image correcting apparatus for an imaging device including a camera module having a first motion sensor, the image correcting apparatus including a second motion sensor sensing a movement, and a controller determining whether the movement gets out of an operation range of the first motion sensor, and correcting an image obtained from the camera module based on movement data sensed by the second motion sensor, when the movement gets out of the operation range of the first motion sensor.

According to an embodiment, an operation range of the second motion sensor is wider than that of the first motion sensor.

According to an embodiment, when the movement gets out of the operation range of the first motion sensor, the controller corrects the image obtained from the camera module based on remaining movement data obtained by subtracting movement data sensed by the first motion sensor from the movement data sensed by the second motion sensor.

According to an embodiment, when the movement gets out of the operation range of the first motion sensor, the controller obtains movement data by using the second motion sensor, starting from a point in time at which the movement gets out of the operation range of the first motion sensor, and correct the image obtained from the camera module based on the movement data obtained by the second motion sensor.

According to an embodiment, the first and second motion sensors include a gyro sensor.

According to an embodiment, the imaging device includes a smartphone, the first motion sensor is a motion sensor within an optical image stabilizer (OIS) module of the smartphone, and the second motion sensor includes a motion sensor of the smartphone outside of the OIS module.

According to an embodiment, the imaging device includes a camera configured to capture a still image or video.

According to another embodiment of the invention, there is provided an image correcting method for an imaging device, including (A) obtaining a strength of handshaking sensed by a first motion sensor, (B) determining whether the strength of handshaking is outside of an operation range of the first motion sensor, and (C) when the strength of handshaking is outside of the operation range of the first motion sensor, correcting an image obtained from a camera module based on handshaking trace data of a second motion sensor.

According to an embodiment, an operation range of the second motion sensor is wider than that of the first motion sensor.

According to an embodiment, operation (B) includes determining whether the strength of handshaking is equal to or greater than a reference value, wherein the reference value is greater than a limit value of the operation range of the first motion sensor.

According to an embodiment, operation (C) includes, when the strength of handshaking is outside of the operation range of the first motion sensor, correcting the image obtained from the camera module based on remaining handshaking trace data obtained by subtracting handshaking trace data sensed by the first motion sensor from the handshaking trace data sensed by the second motion sensor.

According to an embodiment, operation (C) includes, when the strength of handshaking is outside of the operation range of the first motion sensor, obtaining handshaking trace data by using the second motion sensor, starting from a point at which the strength of handshaking gets out of the operation range of the first motion sensor, and correcting the image obtained from the camera module based on the handshaking trace data obtained by the second motion sensor.

According to an embodiment, the first and second motion sensors include a gyro sensor.

According to an embodiment, the imaging device includes a smartphone, the first motion sensor is a motion sensor within an optical image stabilizer (OIS) module of the smartphone, and the second motion sensor includes a motion sensor of the smartphone outside of the OIS module.

According to an embodiment, the imaging device includes a camera capable of capturing a still image or video.

According to another embodiment of the invention, there is provided an image correcting method for an imaging device, including (A) when a shutter is opened to start exposure, obtaining handshake data by using first and second motion sensors, (B) determining whether exposure duration has expired, (C) when the exposure duration has not expired, determining whether strength of handshaking based on the handshake data is equal to or greater than a reference value, and (D) when the strength of handshaking is equal to or greater than the reference value, storing handshaking trace data sensed by the second motion sensor. The image correct method further includes (E) when the strength of handshaking is not equal to or greater than the reference value, storing handshaking trace data sensed by the first motion sensor, (F) when it is determined that the exposure duration has not expired in operation (B), determining whether an image having strength of handshaking equal to or greater than the reference value in the exposure duration exists, and (G) when an image having strength of handshaking equal to or greater than the reference value in the exposure duration exists, correcting an image obtained from a camera module by using the handshaking trace data of the second motion sensor.

According to an embodiment, the operation range of the second motion sensor is wider than that of the first motion sensor.

According to an embodiment, the first and second motion sensors include a gyro sensor.

According to an embodiment, the imaging device includes a smartphone, the first motion sensor is a motion sensor within an optical image stabilizer (OIS) module of the smartphone, and the second motion sensor includes a motion sensor of the smartphone outside of the OIS module.

According to an embodiment, the imaging device includes a camera configured to capture a still image or video.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
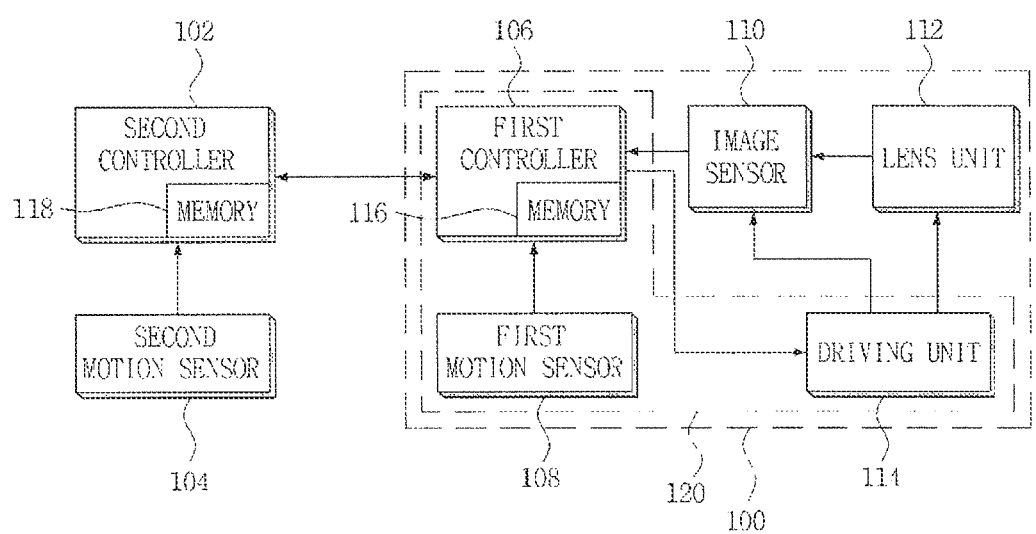
FIG. 1 is a block diagram of an image correcting apparatus for an imaging device, according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

FIG. 1 is a block diagram of an image correcting apparatus for an imaging device, according to an embodiment of the invention.

Hereinafter, the image correcting apparatus for an imaging device according to an embodiment of the invention will be described with reference to FIG. 1.

The image correcting apparatus for an imaging device according to an embodiment of the invention, as illustrated in FIG. 1, includes a second controller 102 receiving data and a control signal from a first controller 106 of a camera module 100 and transmitting a control signal to the first controller 106 and a second motion sensor 104 sensing a movement.

According to an embodiment, the camera module 100 includes the first controller 106 having a memory 116, a first motion sensor 108, an image sensor 110, a lens 112, and a driver unit 114.

According to an embodiment, the first controller 106, the first motion sensor 108, and the driver unit 114 constitute an optical image stabilizer (OIS) module 120 to perform an OIS function, and the first controller 106 and the driver unit 114 execute an auto-focusing function. The first controller 106 controls the driver unit 114 based on handshake data sensed by the first motion sensor 108 to shift the image sensor 110 or the lens 112 in a direction opposite to the direction of handshaking, thus preventing an image from being shaken to have blur.

According to an embodiment, the second controller 102 includes a memory 118. The second controller 102 determines whether a movement gets out of an operation range of the first motion sensor 108. When the movement gets out of an operation range of the first motion sensor 108, the second controller 102 corrects an image obtained from the camera module 100 based on movement data sensed by the second motion sensor 104.

According to an embodiment, it is assumed that the operation range of the first motion sensor 108 is predetermined characteristics and that the operation range of the first motion sensor 108 is stored in the memory 118 in advance. When the operation range of the first motion sensor 108 is stored in the memory 116 of the first controller 106, the second controller 102 may obtain the operation range of the first motion sensor 108 from the first controller 106.

Thus, according to an embodiment, the second controller 102 determines whether the movement gets out of the operation range of the first motion sensor 108 by comparing movement data sensed by the first motion sensor 108 or the second motion sensor 104 with the operation range of the first motion sensor 108.

According to an embodiment, an operation range of the second motion sensor 104 is wider than that of the first motion sensor 108.

In the case in which the movement gets out of the operation range of the first motion sensor 108, the second controller 102 corrects the image obtained from the camera module 100 based on remaining movement data obtained by subtracting movement data sensed by the first motion sensor 108 from the movement data sensed by the second motion sensor 104.

Alternately, in a case in which the movement gets out of the operation range of the first motion sensor 108, the second controller 102 obtains movement data by using the second motion sensor 104, starting from a point in time at which the movement gets out of the operation range of the first motion sensor 108, and corrects the image obtained from the camera module 100 based on the movement data obtained by the second motion sensor 104.

According to an embodiment, the movement includes handshaking, and the second controller 102 obtains a strength of handshaking sensed by the first motion sensor 108 from the camera module 100. Or, the second controller 102 obtains the strength of handshaking sensed by the second motion sensor 104 and determines whether the obtained strength of handshaking is outside of the operation range of the first motion sensor 108. When the strength of handshaking is outside of the operation range of the first motion sensor 108, the second controller 102 corrects the image obtained from the camera module 100 based on handshake race data sensed by the second motion sensor 104 in consideration of OIS of the camera module 100 based on handshake trace data sensed by the first motion sensor 108.

According to an embodiment, the first and second motion sensors 108 and 104 includes a gyro sensor, but embodiments of the invention are not limited thereto.

According to an embodiment, the first motion sensor 108 is a motion sensor within the OIS module 120 of a smartphone, and the second motion sensor 104 is a motion sensor of a smartphone outside of the OIS module.

Also, according to an embodiment, the camera module 100, the second controller 102, and the second motion sensor 104 are included in a camera configured to capture a still image or video, so as to be used to correct an image in a case in which handshaking occurs.

An operation of the image correcting apparatus for an imaging device according to an embodiment of the invention will be described with reference to a flow chart of an image correcting method for an imaging device according to an embodiment of the invention illustrated in FIG. 2.

Figure 2:
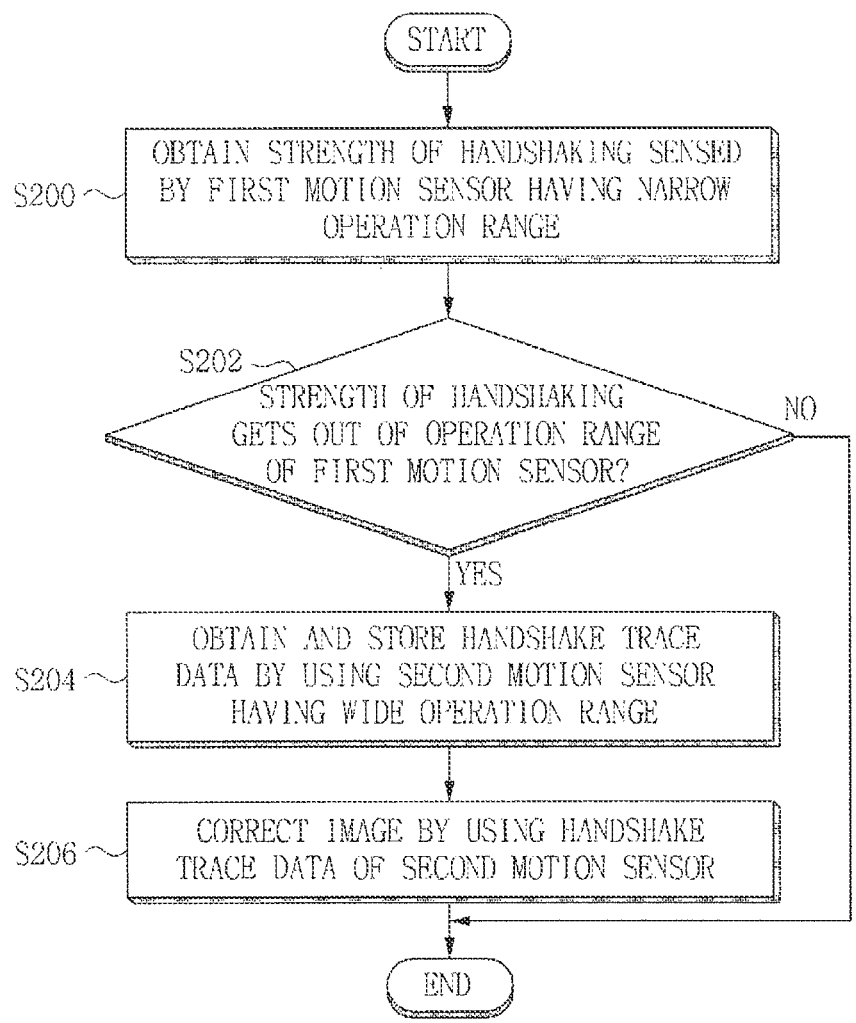
FIG. 2 is a flow chart illustrating an image correcting method for an imaging device, according to an embodiment of the invention.

FIG. 2 is a flow chart illustrating an image correcting method for an imaging device to describe an operation of the image correcting apparatus for an imaging device according to an embodiment of the invention.

Referring to FIGS. 1 and 2, an image correcting method for an imaging device according to an embodiment of the present invention includes obtaining strength of handshaking by using the first motion sensor 108 (S200), determining, by the second controller 102, whether the strength of handshaking is outside of the operation range of the first motion sensor 108 (S202), when the strength of handshaking is outside of the operation range of the first motion sensor 108, obtaining handshake trace data by using the second motion sensor 104 having an operation range wider than that of the first motion sensor 108 and storing the same in the memory 118 (S204), and correcting an image obtained from the camera module 100 by using the handshake trace data of the second motion sensor 104 (S206).

As described above, the image correcting apparatus for an imaging device and an image correcting method for an imaging device, according to embodiments of the invention, in order to obtain a quality image even when handshaking greater than an OIS driving displacement that cannot be corrected by the OIS module 120 including the first motion sensor 108 having a narrow operation range occurs, handshake trace data is obtained by using the second motion sensor 104 located outside of the OIS module 120 and having the operation range wider than that of a smartphone, for example, and used as post-correction data. Thus, when handshaking at an angle greater than that of the OIS module 120 occurs, the second controller 102 corrects an image by using the handshake trace data obtained by the second motion sensor 104, obtaining a clear image.

This is because, although the motion sensor of the smartphone has a low operation speed and low resolution, compared to the motion sensor for the OIS, it measures an angular velocity having a wide range.

Referring to a general post-correcting method of an image according to the conventional art, for example, a deblur algorithm predicts handshake trace data from a blurred image, back-tracks a path of camera shaking, and performs deblurring. In this case, it is impossible to predict a handshake trace to perfectly restore an image in terms of characteristics of the prediction algorithm.

However, in the embodiment of the invention, handshake trace data is directly obtained, rather than being predicted, and therefore quality of a restored image is enhanced.

Meanwhile, in a case in which the strength of handshaking is outside of the operation range of the first motion sensor 108, the second controller 102 corrects the image obtained from the camera module 100 based on the handshake trace data sensed by the second motion sensor 104, and in this case, the handshake trace data sensed by the first motion sensor 108 is excluded in correcting the image.

The reason is because, when the strength of handshaking is outside of the operation range of the first motion sensor 108, an output of the first motion sensor 108 is saturated, and in order to prevent generation of blue in the image due to handshaking, the OIS module 120 of the camera module 100 shifts the image sensor 110 or the lens unit 112 based on the handshake trace data sensed by the first motion sensor 108.

Thus, in the case in which the strength of handshaking is outside of the operation range of the first motion sensor 108, the second controller 102 corrects the image obtained from the camera module 100 based on remaining handshake trace data obtained by subtracting the handshake trace data sensed by the first motion sensor 108 from the handshake trace data sensed by the second motion sensor 104.

Alternatively, in the case in which the strength of handshaking is outside of the operation range of the first motion sensor 108, the second controller 102 may obtain handshake trace data by using the second motion sensor 104, starting from a point in time at which the strength of handshaking gets out of the operation range of the first motion sensor 108, and correct the image obtained from the camera module 100 based on the handshake trace data obtained by the second motion sensor 104.

Figure 3:
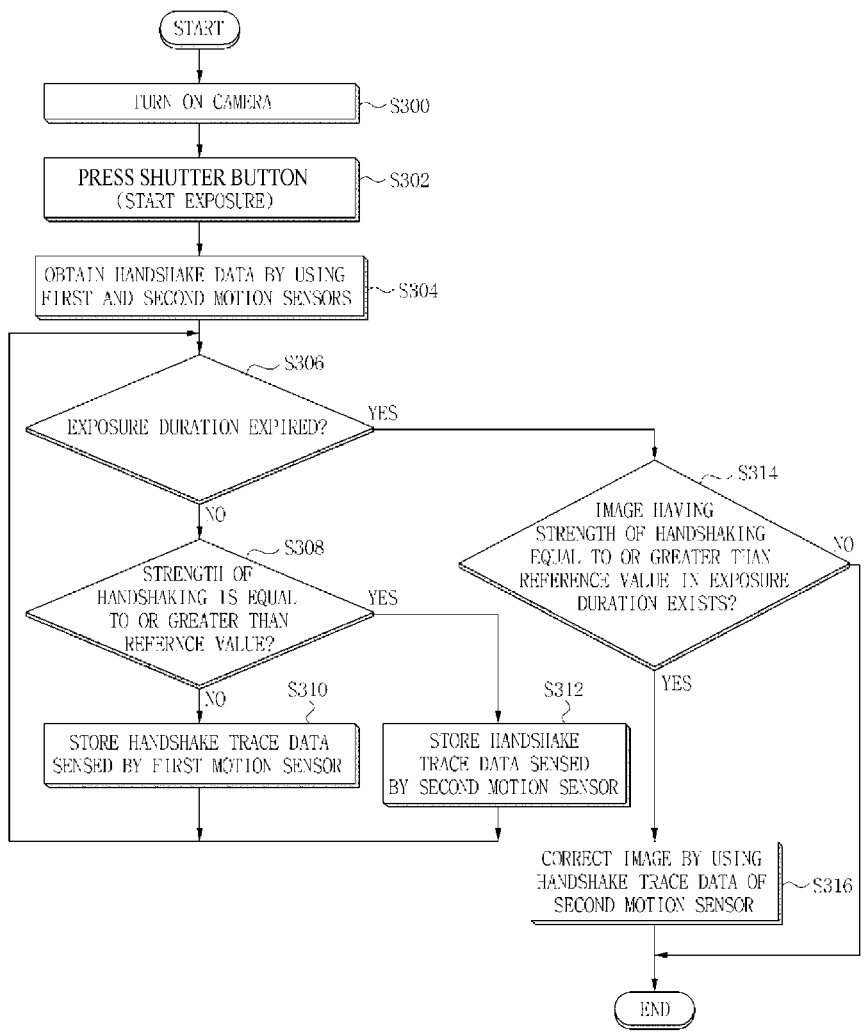
FIG. 3 is a flow chart illustrating an image correcting method for an imaging device, according to an embodiment of the invention.

FIG. 3 is a flow chart illustrating an image correcting method for an imaging device, according to an embodiment of the invention.

Referring to FIG. 3, in an image correcting method for an imaging device, according to another embodiment of the invention, when a user turns on a camera in operation S300 and presses a shutter button to start exposure in operation S302, handshake data obtained by the first motion sensor 108 and the second motion sensor 104 is stored in the memory 116 and 118 in operation S304. Namely, handshake data, movement information of an imaging device, is obtained from the moment the image sensor 110 is exposed, and stored in the memories 116 and 118. The second controller 102 obtains data regarding a degree of a movement of the imaging device due to handshaking, for example, through the handshake data.

In the above, the first motion sensor 108 includes a gyro sensor included in the OIS module 120 of the smartphone and having a narrow operation range, and the second motion sensor 104 is a motion sensor positioned outside of the OIS module 120 and having an operation range wider than that of the first motion sensor 108 included in the smartphone.

In operation S306, it is determined whether an exposure duration has expired. In a case in which the exposure duration has not expired in operation S306, it is determined whether strength of handshaking based on the handshake data is equal to or greater than a reference value in operation S308. The reference value may include a value greater than a limit value of the operation range of the first motion sensor 108.

In the case in which the strength of handshaking is not equal to or greater than the reference value, handshake tract data sensed by the first motion sensor 108 is stored in the memory 116 in operation S310.

In a case in which the strength of handshaking is equal to or greater than the reference value, handshake tract data sensed by the second motion sensor 104 is stored in the memory 118 in operation S312.

Figure 4:
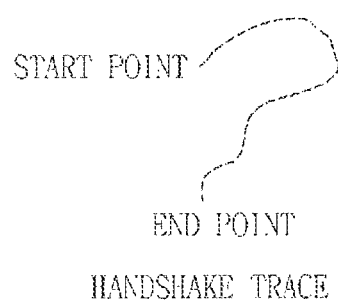
FIG. 4 is a view illustrating a trace of handshaking obtained from movement information two-dimensionally, according to an embodiment of the invention.

FIG. 4 is a view illustrating a trace of handshaking obtained from movement information two-dimensionally, according to an embodiment of the invention. As illustrated in FIG. 3, sampled data of a trace of handshaking is stored in the memory 118 in operation S312.

In a case in which it is determined that the exposure duration has expired in operation S306, it is determined whether an image having strength of handshaking equal to or greater than the reference value during the exposure duration exists in operation S314.

In a case in which an image having strength of handshaking equal to or greater than the reference value during the exposure duration exists, the image having strength of handshaking equal to or greater than the reference value during the exposure duration obtained from the camera module 100 is corrected by using handshake trace data of the second motion sensor 104 in operation S316. In operation S316, in a case in which an image having strength of handshaking equal to or greater than the reference value during the exposure duration exists, data regarding a path of a movement of the imaging device due to handshaking, for example, in the duration is obtained by using the second motion sensor 104 having an operation range as large as that of the motion sensor of the smartphone, and the image is corrected through the movement information such as the obtained handshake trace data.

In operation S316, the image is corrected through the trace of handshaking obtained from the movement information. In operation S316, as illustrated in FIG. 3, sample data of the trace of handshaking is obtained from the memory 118, and the image is corrected by using the data.

Meanwhile, various methods may be used to correct the image in operation S316. For example, the image may be corrected by using a technique called image deblurring.

According to an embodiment, the image deblurring is a technique of collecting information regarding an image shaken during an imaging process, estimating an original form, and restoring the original form, which includes an algorithm of estimating the original form by tracking a path of the camera shaking. If accurate data of movement information of the imaging device is provided, it may be important reference data for an image correcting operation, and an image even clearer than that of the case of using an estimate value may be obtained.

Equation 1 expresses the image deblurring technique mathematically.

$$B = L*K + N \quad \text{[Equation 1]}$$

Here, B is a blurred image, L is an original image as a latent sharp image, K is a motion blur kernel or a point spread function (PSF), and N is noise.

According to Equation 1, the blurred image B refers to a deformed image of the original image L modeled by convolution of the motion blur kernel K, and in order to restore the original image L, the motion blur kernel K is searched and deconvoluted to the blurred image B.

In a general image deblurring algorithm, much time is taken to estimate the motion blue kernel K and an error is generated.

According to an embodiment, movement information of the imaging device is used to search the motion blur kernel K, thus shortening an image correction time and enhancing image quality.

According an embodiment, image correcting process is directly performed in an internal process of the imaging device, or is performed in a high speed system, such as a desktop computer, for example.

According an embodiment, a method of including movement information in a tag information of an image by simplifying the movement information is also considered. Through this method, the original file and a movement information file are separately kept in storage, and the original file is kept in storage without loss all the time.

According an embodiment, an image is occasionally distorted by an image correction algorithm, so it is important to keep the original file in storage. In this case, the following operation may be performed.

For example, when a camera is connected to a desktop computer, an image of the camera and a movement information file are downloaded from a computer program, and the computer, a high speed system, performs image correction. According to various embodiments, the sequential processes are automated to perform OIS operation in a user-friendly manner.

According to the embodiments of the present invention, even when displacement of handshaking is at an angle equal to or greater than a correction angle of an OIS module, an image is prevented from being blurred, and thus, a clear image is obtained.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention.

Accordingly, the scope of the present invention should be determined by the following claims and their appropriate legal equivalents.

What is claimed is:

1. An image correcting apparatus for an imaging device including a camera module having a first motion sensor, the apparatus comprising:
    a second motion sensor configured to sense a movement; and
    a controller configured to determine whether the movement gets out of an operation range of the first motion sensor, and further configured to correct an image obtained from the camera module based on movement data sensed by the second motion sensor when the movement gets out of the operation range of the first motion sensor.

2. The apparatus as set forth in claim 1, wherein an operation range of the second motion sensor is wider than an operation range of the first motion sensor.

3. The apparatus as set forth in claim 1, wherein, when the movement gets out of the operation range of the first motion sensor, the controller is further configured to correct the image obtained from the camera module based on remaining movement data obtained by subtracting movement data sensed by the first motion sensor from the movement data sensed by the second motion sensor.

4. The apparatus as set forth in claim 1, wherein, when the movement gets out of the operation range of the first motion sensor, the controller is further configured to obtain the movement data by using the second motion sensor, starting from a point in time at which the movement gets out of the operation range of the first motion sensor, and further configured to correct the image obtained from the camera module based on the movement data obtained by the second motion sensor.

5. The apparatus as set forth in claim 1, wherein the first and second motion sensors include a gyro sensor.

6. The apparatus as set forth in claim 1, wherein the imaging device includes a smartphone, the first motion sensor is a motion sensor within an optical image stabilizer (OIS) module of the smartphone, and the second motion sensor includes a motion sensor of the smartphone outside of the OIS module.

7. The apparatus as set forth in claim 1, wherein the imaging device includes a camera configured to capture a still image or video.

8. An image correcting method for an imaging device, the method comprising:
    (A) obtaining a strength of handshaking sensed by a first motion sensor;
    (B) determining whether the strength of handshaking is outside of an operation range of the first motion sensor; and
    (C) when the strength of handshaking is outside of the operation range of the first motion sensor, correcting an image obtained from a camera module based on handshaking trace data of a second motion sensor.

9. The method as set forth in claim 8, wherein an operation range of the second motion sensor is wider than an operation range of the first motion sensor.

10. The method as set forth in claim 8, wherein operation (B) includes determining whether the strength of handshaking is equal to or greater than a reference value, wherein the reference value is greater than a limit value of the operation range of the first motion sensor.

11. The method as set forth in claim 8, wherein operation (C) includes, when the strength of handshaking is outside of the operation range of the first motion sensor, correcting the image obtained from the camera module based on remaining handshaking trace data obtained by subtracting handshaking trace data sensed by the first motion sensor from the handshaking trace data sensed by the second motion sensor.

12. The method as set forth in claim 8, wherein operation (C) includes, when the strength of handshaking is outside of the operation range of the first motion sensor, obtaining the handshaking trace data by using the second motion sensor, starting from a point at which the strength of handshaking gets out of the operation range of the first motion sensor, and correcting the image obtained from the camera module based on the handshaking trace data obtained by the second motion sensor.

13. The method as set forth in claim 8, wherein the first and second motion sensors include a gyro sensor.

14. The method as set forth in claim 8, wherein the imaging device includes a smartphone, the first motion sensor is a motion sensor within an optical image stabilizer (OIS) module of the smartphone, and the second motion sensor includes a motion sensor of the smartphone outside of the OIS module.

15. The method as set forth in claim 8, wherein the imaging device includes a camera configured to capture a still image or video.

* * * * *